United States Patent
Huang

(10) Patent No.: US 8,914,746 B2
(45) Date of Patent: Dec. 16, 2014

(54) SYSTEM AND METHOD FOR FOCUSING ICONS OF HAND-HELD ELECTRONIC DEVICE

(75) Inventor: Kai-Lin Huang, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 72 days.

(21) Appl. No.: 13/450,730

(22) Filed: Apr. 19, 2012

(65) Prior Publication Data

US 2012/0287150 A1  Nov. 15, 2012

(30) Foreign Application Priority Data

May 12, 2011 (TW) .............................. 100116652 A

(51) Int. Cl.
*G06F 3/048* (2013.01)
*G09G 5/00* (2006.01)
*G06F 3/0489* (2013.01)
*G06F 3/0481* (2013.01)

(52) U.S. Cl.
CPC .............. *G09G 5/00* (2013.01); *G06F 3/04892* (2013.01); *G06F 3/04817* (2013.01)
USPC ............................ 715/812; 715/861; 345/619

(58) Field of Classification Search
None
See application file for complete search history.

(56) References Cited

U.S. PATENT DOCUMENTS

| | | | | |
|---|---|---|---|---|
| 5,754,179 | A * | 5/1998 | Hocker et al. | 715/835 |
| 5,867,729 | A * | 2/1999 | Swonk | 710/8 |
| 7,099,775 | B1 * | 8/2006 | Hanshew et al. | 701/468 |
| 2005/0289164 | A1 * | 12/2005 | Yoon | 707/100 |
| 2007/0067744 | A1 * | 3/2007 | Lane et al. | 715/860 |
| 2008/0084389 | A1 * | 4/2008 | Mac | 345/158 |
| 2009/0300540 | A1 * | 12/2009 | Russell | 715/783 |
| 2012/0313862 | A1 * | 12/2012 | Ko et al. | 345/173 |
| 2012/0319985 | A1 * | 12/2012 | Moore et al. | 345/173 |
| 2013/0050263 | A1 * | 2/2013 | Khoe et al. | 345/634 |
| 2013/0169667 | A1 * | 7/2013 | Gardenfors | 345/619 |

* cited by examiner

*Primary Examiner* — David Zarka
*Assistant Examiner* — David H Chu
(74) *Attorney, Agent, or Firm* — Novak Druce Connolly Bove + Quigg LLP

(57) ABSTRACT

A display screen of a hand-held electronic device displays a plurality of icons corresponding to application programs of the hand-held electronic device. The hand-held electronic device includes an up/down-arrow key and a left/right-arrow key. If the up/down-arrow key has been operated, the hand-held electronic device focuses an icon according to an operation direction of the up/down-arrow key and a frequency of use relating to each icon. If the left/right-arrow key has been operated, the hand-held electronic device focuses an icon according to an operation direction of the left/right-arrow key and a use time of each icon.

3 Claims, 6 Drawing Sheets

| Name | Use times | Use time |
|---|---|---|
| Browser | 7 | xxx |
| Setting | 4 | xxx |
| Calculator | 3 | xxx |
| Message | 1 | xxx |

FIG. 6

SYSTEM AND METHOD FOR FOCUSING ICONS OF HAND-HELD ELECTRONIC DEVICE

BACKGROUND

1. Technical Field

Embodiments of the present disclosure relate to icons management systems and methods, and more particularly to a system and a method for focusing icons of a hand-held electronic device.

2. Description of Related Art

A hand-held electronic device, such as a cell phone, has a plurality of software applications. Icons of the application programs can help users to identify and use the application conveniently. If there are too many icons displayed on a display screen of the hand-held electronic device, the users may have to spend much time for searching a desired icon.

BRIEF DESCRIPTION OF THE DRAWINGS

FIG. 6 illustrates one embodiment of an information table of the icons.

DETAILED DESCRIPTION

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media may include CDs, DVDs, BLU-RAY, flash memory, and hard disk drives.

Figure 1:
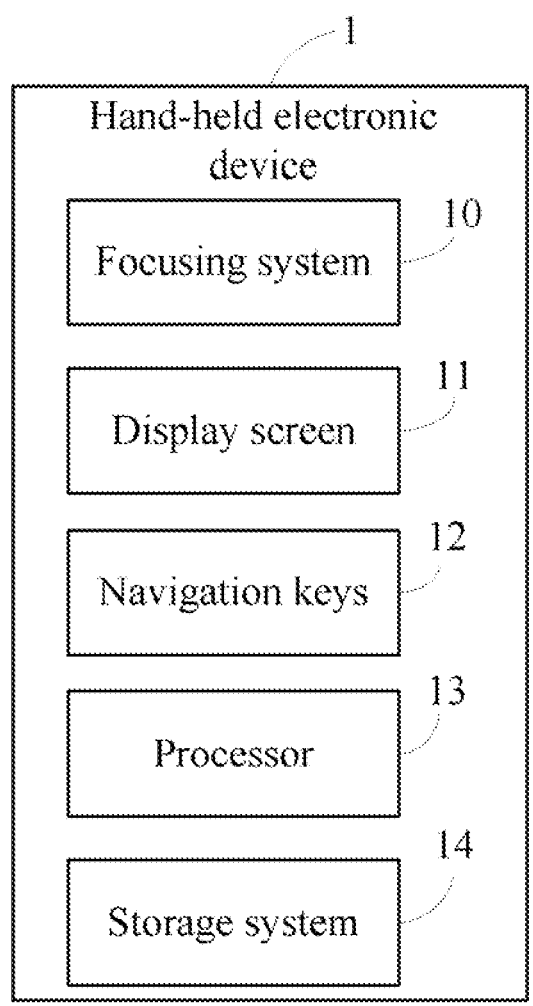
FIG. 1 is a block diagram of one embodiment of a hand-held electronic device comprising a focusing system.

FIG. 1 is a block diagram of one embodiment of a hand-held electronic device 1 comprising a focusing system 10. In some embodiments, the hand-held electronic device 1 may be a mobile phone, for example. The hand-held electronic device 1 includes a display screen 11. The display screen 11 displays a plurality of icons of software applications of the hand-held electronic device 1. For example, the icons may include a browser icon, a message icon and a setting icon. The icons can be created or deleted by users. In one embodiment, the display screen 11 may be a touch screen. The hand-held electronic device 1 includes navigation keys 12. The navigation keys 12 include an up/down-arrow key and a left/right-arrow key. The up/down-arrow key includes an up-arrow key and a down-arrow key. The left/right-arrow key includes a left-arrow key and a right-arrow key.

In an exemplary embodiment, the hand-held electronic device 1 includes at least one processor 13 and a storage system 14. The focusing system 10 may include one or more modules (also described in FIG. 2). The one or more modules may comprise computerized code in the form of one or more programs that are stored in the storage system 14 (or memory). In one embodiment, the storage system 14 may be a magnetic, an optical storage system, or other suitable storage medium. The computerized code includes instructions that are executed by the at least one processor 13 to provide functions for the one or more modules described below. The storage system 14 stores an information table. The information table includes a name column, a use times column, and a use time column, as shown in FIG. 6. Each value of the use times column indicates how many times that the icon has been used. Each value of the use time column indicates the last time that an icon was used.

Figure 2:
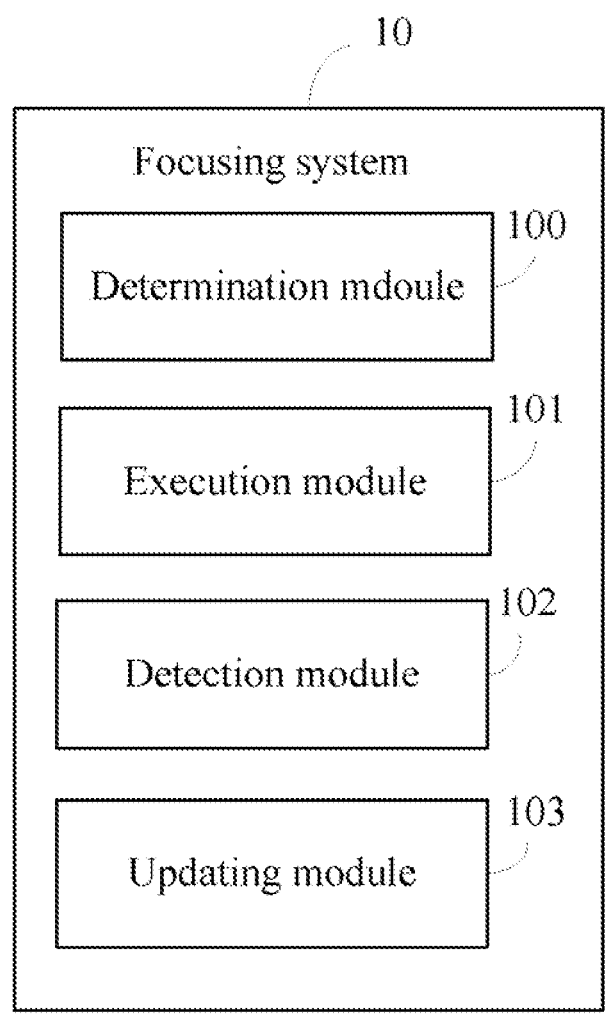
FIG. 2 is a block diagram of one embodiment of the function modules of the focusing system in FIG. 1.

As shown in FIG. 2, the focusing system 10 may include a determination module 100, an execution module 101, a detection module 102, and an updating module 103.

When the display screen 11 is displaying the icons, the determination module 100 determines if the up/down-arrow key or the left/right-arrow key of the hand-held electronic device 1 have been operated by a user.

If the up/down-arrow key has been operated, the execution module 101 focuses an icon according to an operation direction of the up/down-arrow key and a use times of each icon. In some embodiments, the execution module 101 focuses the icon by highlighting the icon with a graphic (such as a rectangle) or a color.

In one embodiment, the execution module 101 detects if the up-arrow key or the down-arrow key has been operated. If the up-arrow key has been operated, the execution module 101 detects if an icon is being focused. If an icon is being focused, the execution module 101 refreshes the information table according to the use times of each icon. In one embodiment, the use times appears from a minimum value to a maximum value. The execution module 101 determines, in the information table, a next icon having a use times that is more than the use times of the icon being focused, and focuses the next icon. If no icon is being focused, the execution module 101 determines an icon having a use times with the maximum value in the information table, and focuses the determined icon.

If the down-arrow key has been operated and an icon is being focused, the execution module 101 determines a prior icon having a use times that is less than the use times of the focused icon in the information table, and focuses the determined prior icon. If the down-arrow key has been operated and no icon is being focused, the execution module 101 determines an icon having a use times with the minimum value in the information table, and focuses the determined icon.

For example, as shown in FIG. 6, the value of the use times of the icon "browser" is at the maximum, and the value of the use times of the icon "message" is at the minimum. If no icon is being focused and the up-arrow key has been operated, the execution module 101 focuses the icon "browser." If no icon is being focused and the down-arrow key has been operated, the execution module 101 focuses the icon "message." If the icon "browser" is focused and the down-arrow key has been operated, the execution module 101 determines that the next icon is the icon "setting" in the information table, and focuses the icon "setting."

If the left/right-arrow key has been operated, the execution module 101 calculates a time difference between each use of each icon in the information table by reference to a first current system time of the hand-held electronic device 1. The execution module 101 determines an icon according to the time difference and the operated left/right-arrow key.

For example, the execution module 101 detects if the left-arrow key or the right-arrow key has been operated. If the left-arrow key has been operated, the execution module 101 sorts the calculated time differences in sequence. The sequence may be from the maximum value to the minimum value. The execution module further determines an icon corresponding to the minimum value of the time difference, and focuses the determined icon. If the right-arrow key has been operated, the execution module 101 determines a prior value before the minimum value, and focuses an icon corresponding to the determined prior value.

The detection module 102 detects if the focused icon is clicked by the user. If the focused icon is clicked, the updating module 103 adds one to the value of the use times corresponding to the focused icon, and records the time of use of the focused icon according to a second system time of the hand-held electronic device 1, in the information table.

Figure 3:
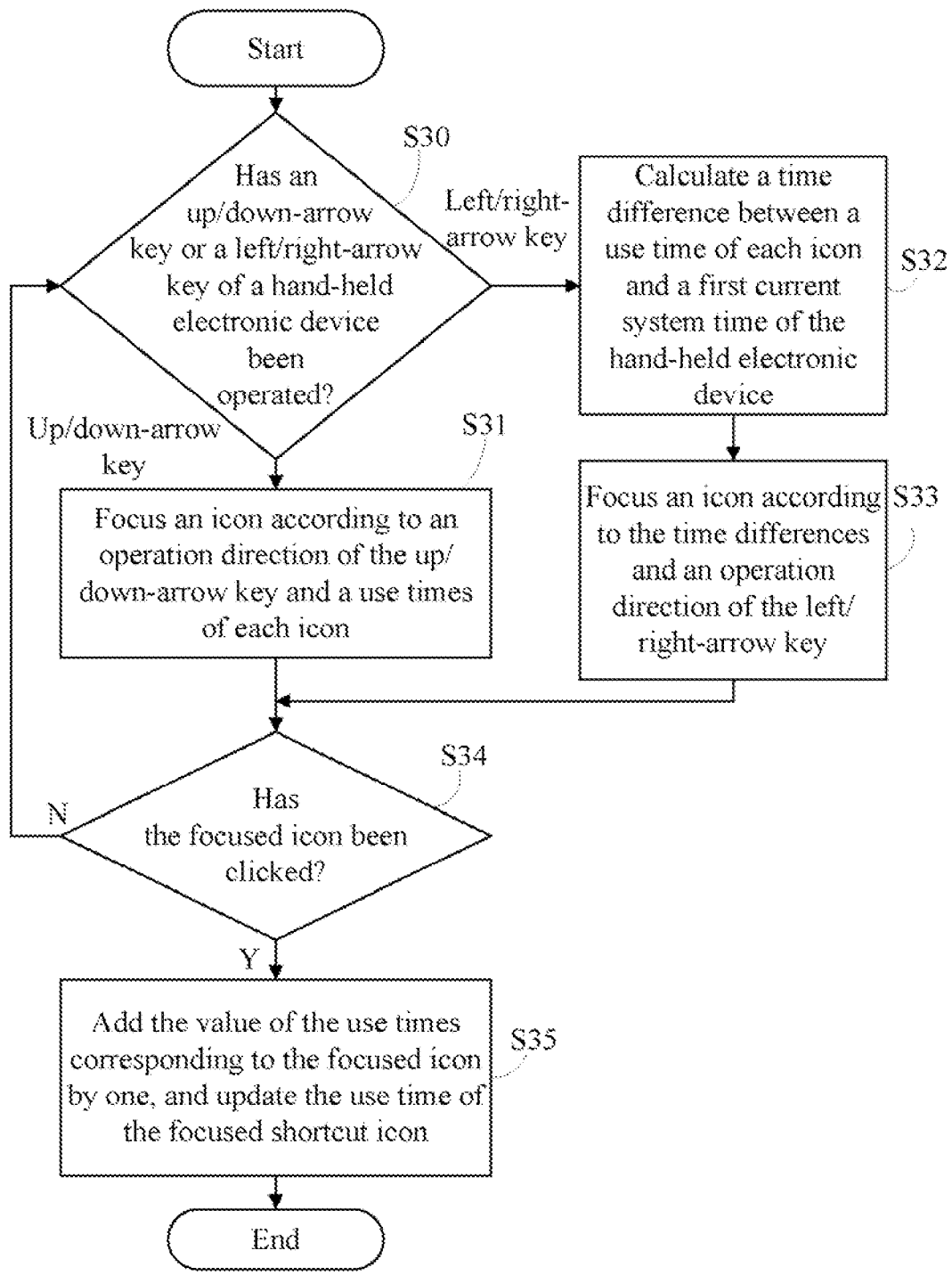
FIG. 3 is a flowchart illustrating one embodiment of a method for focusing icons of the hand-held electronic device.

FIG. 3 is a flowchart illustrating a method for focusing icons of a hand-held electronic device. Depending on the embodiment, additional steps may be added, others removed, and the ordering of the blocks may be changed.

In step S30, the determination module 100 determines if the up/down-arrow key or the left/right-arrow key of the hand-held electronic device 1 have been operated when the display screen 11 is displaying the icons. If the user operates the up/down-arrow key, step S31 is implemented. If the user operates the left/right-arrow key, step S32 is implemented.

In step S31, the execution module 101 focuses an icon according to an operation direction of the up/down-arrow key and use times of each icon. The operation direction includes up direction and down direction.

In step S32, the execution module 101 calculates a time difference between the present use of each icon and the most recent past use in the information table by reference to a first current system time of the hand-held electronic device 1.

In step S33, the execution module 101 focuses an icon according to the time differences and an operation direction of the left/right-arrow key. The operation direction of the left/right-arrow key includes left direction and right direction.

In step S34, the detection module 102 detects if the focused icon is clicked by the user. If the user has clicked the icon, step S35 is implemented. If the user has not clicked the icon, step S30 is repeated.

In step S35, the updating module 103 adds one to the value of the use times corresponding to the focused icon, and records the present time of use of the focused icon by reference to a second system time of the hand-held electronic device 1, in the information table.

Figure 4:
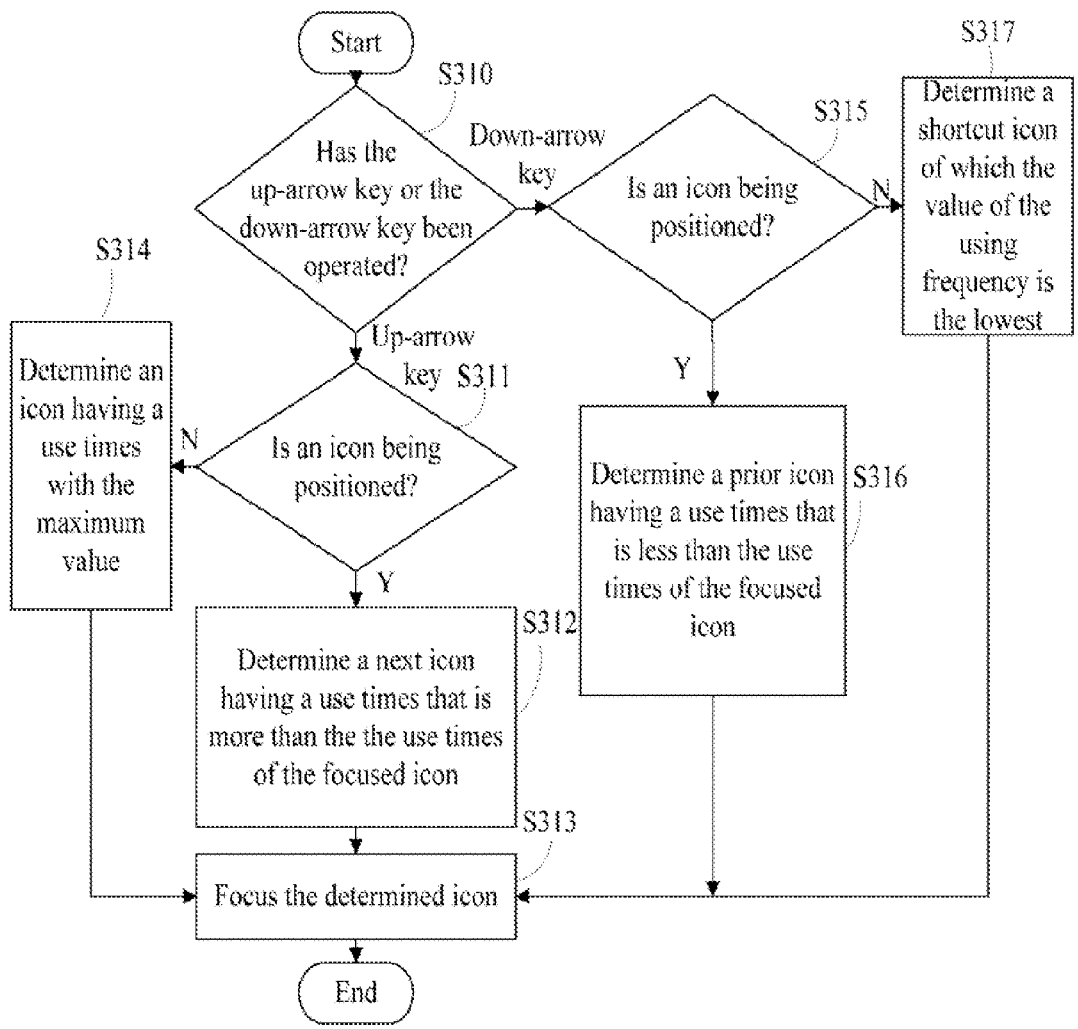
FIG. 4 is a detail flowchart illustrating block S31 of the method of FIG. 3.

FIG. 4 is a detail flowchart illustrating step S31 of FIG. 3. Depending on the embodiment, additional steps may be added, others removed, and the ordering of the steps may be changed.

In step S310, the execution module 101 detects if the up-arrow key or the down-arrow key has been operated. If the up-arrow key has been operated, step S311 is implemented. If the down-arrow key has been operated, step S315 is implemented.

In step S311, the execution module 101 detects if an icon is being focused. If an icon is being focused, step S312 is implemented. If no icon is being focused, step S314 is implemented.

In step S312, the execution module 101 refreshes the information table according to the use times of each icon, and determines a next icon having a use times that is more than the use times of the focused icon.

In step S313, the execution module 101 focuses the determined icon.

In step S314, the execution module 101 determines an icon having a use times with the maximum value in the information table, and step S313 as described above is implemented.

In step S315, the execution module 101 detects if an icon is being focused. If an icon is being focused, step S316 is implemented. If no icon is being focused, step S317 is implemented.

In step S316, the execution module 101 determines a prior icon having a use times that is less than use times of the focused icon, and step S313 as described above is implemented.

In step S317, the execution module 101 determines an icon having a use times with the minimum value in the information table, and step S313 as described above is implemented.

Figure 5:
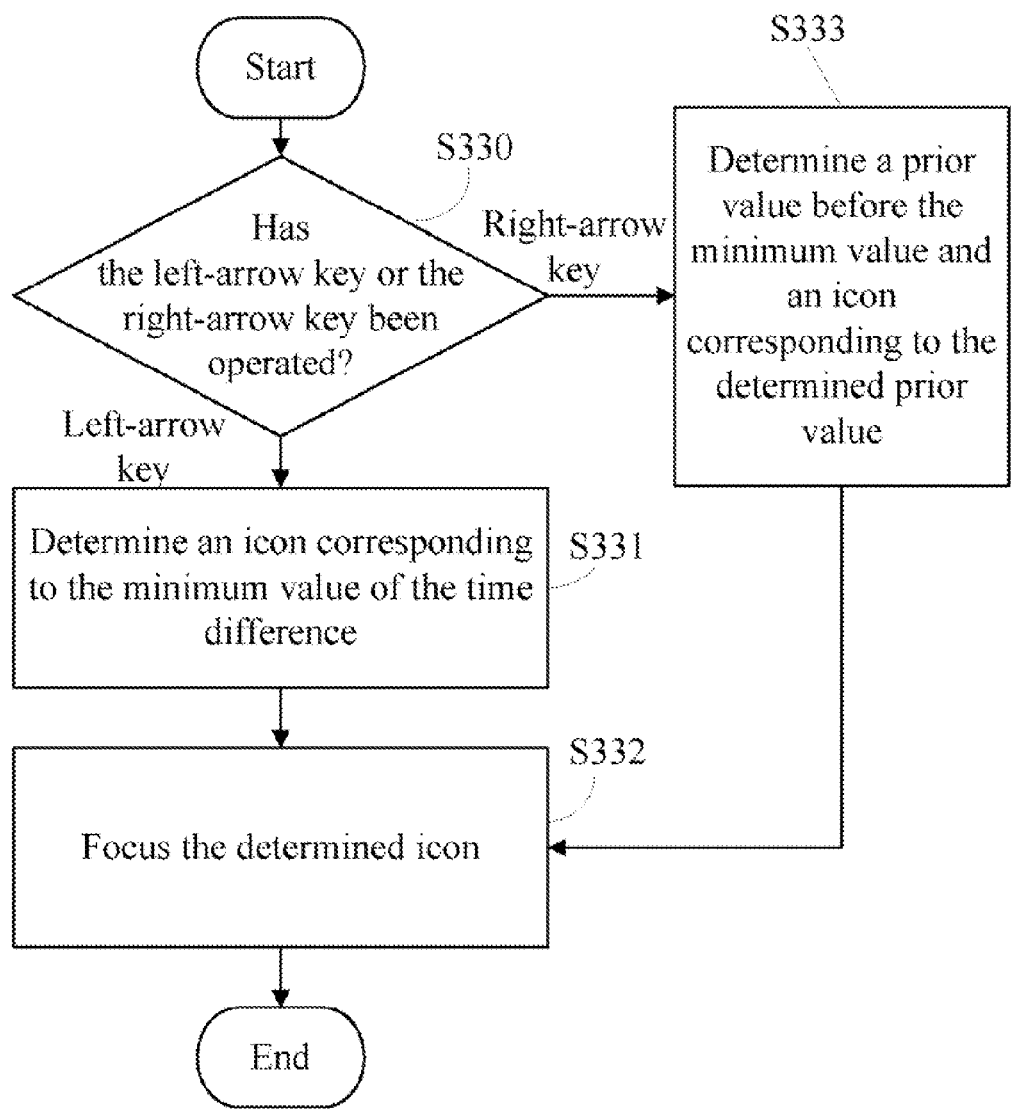
FIG. 5 is a detail flowchart illustrating block S33 of the method of FIG. 3.

FIG. 5 is a detail flowchart illustrating step S33 of FIG. 3. Depending on the embodiment, additional steps may be added, others removed, and the ordering of the steps may be changed.

In step S330, the execution module 101 detects if the left-arrow key or the right-arrow key has been operated. If the left-arrow key has been operated, step S331 is implemented. If the right-arrow key has been operated, step S333 is implemented.

In step S331, the execution module 101 sorts the calculated time differences in sequence, and determines an icon corresponding to the minimum value of the time differences.

In step S332, the execution module 101 focuses the determined icon.

In step S333, the execution module 101 determines a prior value before the minimum value, determines an icon corresponding to the determined prior value, and step S332 as described above is implemented.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A hand-held electronic device, comprising:
an up/down-arrow key and a left/right-arrow key;
a storage system;
at least one processor; and
one or more programs being stored in the storage system and executable by the at least one processor, the one or more programs comprising:
an execution module operable to focus an icon displayed on a display screen of the hand-held electronic device according to an operation direction of the up/down-arrow key and a use times of each icon when the up/down-arrow key has been operated, or to calculate a time difference between a use time of each icon and a first current system time of the hand-held electronic device if the left/right-arrow key has been operated, and focus an icon according to the time differences and an operation direction of the left/right-arrow key;
and an updating module operable to add a value of the use times corresponding to the focused icon by one, and update the use time of the focused icon using a second current system time of the hand-held electronic device, and store the updated value of the use times and the use time of the focused shortcut in an information table when the focused icon has been clicked; and the execution module further operable to:

refresh the information table according to the use times of each icon, determine a next icon having a use times that is more than the use times of a focused icon and focus the determined icon when an up-arrow key of the up/down-arrow key has been operated, and operable to determine an icon having the use times with the maximum value in the information table, and focus the determined icon when no icon is being focused and the up-arrow key has been operated; and determine a prior icon having a use times that is less than the value of the use times of the focused icon in the information table, and focus the determine prior icon when a down-arrow key of the up/down-arrow key has been operated, and to determine an icon having a use times with the minimum value in the information table and focus the determined icon when no icon is being focused and the down-arrow key of the up/down-arrow key has been operated; and sort the calculated time differences in sequence, determine an icon corresponding to the minimum value of the time difference, and focus the determined icon when a left key of the left/right-arrow key has been operated; and determine a prior value before the minimum value, and focus an icon corresponding to the prior value when a right-arrow key of the left/right-arrow key has been operated.

2. A computer-based method for focusing icons of a hand-held electronic device, comprising:

(a) focusing an icon displayed on a display screen of the hand-held electronic device according to an operation direction of an up/down-arrow key of the hand-held electronic device and use times of each icon when the up/down-arrow key of the hand-held electronic device have been operated;

(b) calculating a time difference between a use time of each icon and a first current system time of the hand-held electronic device when a left/right-arrow key of the hand-held electronic device has been operated, and focusing an icon according to the time differences and an operation direction of the left/right-arrow key; and (c) adding a value of the use times corresponding to the focused icon by one, and updating the use time of the focused icon using a second current system time of the hand-held electronic device, and storing the updated value of the use times and the use time of the focused shortcut in an information table when the focused icon has been clicked; and wherein step (a) further comprises:

refreshing the information table according to the use times of each icon, determining a next icon having a use times that is more than the use times of a focused icon and focus the determined icon when an up-arrow key of the up/down-arrow key has been operated;

determining a shortcut having a use times with the maximum value in the information table, and focusing the determined icon when no icon is being focused and the up-arrow key has been operated;

determining a prior icon having the use times that is less than the use times of the focused icon in the information table, and focusing the determine prior icon when a down-arrow key of the up/down-arrow key has been operated; and determining an icon having a use times with the minimum value in the information table, and focusing the determined icon when no icon has been focused and the down-arrow key of the up/down-arrow key has been operated; and wherein step (b) further comprises:

sorting the calculated time differences in sequence, determining an icon corresponding to the minimum value of the time difference, and focusing the determined icon when a left key of the left/right-arrow key has been operated; and determining a prior value before the minimum value, and focusing an icon corresponding to the prior value when a right key of the left/right-arrow key has been operated.

3. A non-transitory storage medium having stored thereon instructions that, when executed by a processor, cause the processor to perform a method for focusing icons of a hand-held electronic device, the method comprising:

(a) focusing an icon displayed on a display screen of the hand-held electronic device according to an operation direction of an up/down-arrow key of the hand-held electronic device and use times of each icon when the up/down-arrow key of the hand-held electronic device have been operated;

(b) calculating a time difference between a use time of each icon and a first current system time of the hand-held electronic device when a left/right-arrow key of the hand-held electronic device has been operated, and focusing an icon according to the time differences and an operation direction of the left/right-arrow key; and (c) adding a value of the use times corresponding to the focused icon by one, and updating the use time of the focused icon using a second current system time of the hand-held electronic device, and storing the updated value of the use times and the use time of the focused shortcut in an information table when the focused icon has been clicked; and wherein step (a) further comprises:

refreshing the information table according to the use times of each icon, determining a next icon having a use times that is more than the use times of a focused icon and focus the determined icon when an up-arrow key of the up/down-arrow key has been operated;

determining a shortcut having a use times with the maximum value in the information table, and focusing the determined icon when no icon is being focused and the up-arrow key has been operated;

determining a prior icon having the use times that is less than the use times of the focused icon in the information table, and focusing the determine prior icon when a down-arrow key of the up/down-arrow key has been operated; and determining an icon having a use times with the minimum value in the information table, and focusing the determined icon when no icon has been focused and the down-arrow key of the up/down-arrow key has been operated; and wherein step (b) further comprises:

sorting the calculated time differences in sequence, determining an icon corresponding to the minimum value of the time difference, and focusing the determined icon when a left key of the left/right-arrow key has been operated; and determining a prior value before the minimum value, and focusing an icon corresponding to the prior value when a right key of the left/right-arrow key has been operated.

* * * * *